(12) United States Patent
Lee

(10) Patent No.: US 6,610,223 B2
(45) Date of Patent: *Aug. 26, 2003

(54) FOCUSED ACOUSTIC ENERGY IN THE GENERATION OF SOLID PARTICLES

(75) Inventor: David Soong-Hua Lee, Mountain View, CA (US)

(73) Assignee: Picoliter Inc., Sunnyvale, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 09/823,890

(22) Filed: Mar. 30, 2001

(65) Prior Publication Data

US 2002/0140118 A1 Oct. 3, 2002

(51) Int. Cl.$^7$ ................................................. B29B 9/00
(52) U.S. Cl. ..................... 264/9; 264/5; 264/7; 425/6; 425/10
(58) Field of Search .................... 264/9, 7, 5; 425/6, 425/10

(56) References Cited

U.S. PATENT DOCUMENTS

| | | | |
|---|---|---|---|
| 4,308,547 A | 12/1981 | Lovelady et al. | 346/140 R |
| 5,041,849 A | 8/1991 | Quate et al. | 346/140 R |
| 5,874,029 A | 2/1999 | Subramaniam et al. | 264/12 |
| 2002/0000681 A1 | 1/2002 | Gupta et al. | 264/9 |

FOREIGN PATENT DOCUMENTS

| | | |
|---|---|---|
| EP | 0542314 | 7/1998 |
| WO | WO 00/37169 | 6/2000 |
| WO | WO 00/44468 | 8/2000 |
| WO | WO 02/13786 | 2/2002 |
| WO | WO 02/24325 | 3/2002 |

OTHER PUBLICATIONS

Debenedetti et al. (1993), "Application of Supercritical Fluids for the Production fo Sustained Delivery Devices," *Journal of Controlled Release* 24:27–44.

Tom et al. (1991), "Formation of Bioerodible Polymeric Microspheres and Microparicles by Rapid Expansion of Supercritical Solutions," *Biotechnol. Prog.* 7(5):403–411.

Primary Examiner—Mary Lynn Theisen
(74) *Attorney, Agent, or Firm*—Dianne E. Reed; Reed & Eberle LLP

(57) ABSTRACT

A method and device for generating solid particles using focused acoustic energy are provided. A solution of a compound of interest is provided in a solvent, which may be an aqueous fluid, a nonaqueous fluid, or a supercritical fluid. Focused acoustic energy is used to eject a droplet of the solution, which is then directed into or through an antisolvent that upon admixture with the solution droplet causes the compound in the droplet to precipitate. In a preferred embodiment, the solvent is an aqueous or organic liquid, and the antisolvent is a supercritical fluid.

109 Claims, 1 Drawing Sheet

FOCUSED ACOUSTIC ENERGY IN THE GENERATION OF SOLID PARTICLES

TECHNICAL FIELD

This invention relates generally to the manufacture of particles, and more particularly relates to the use of focused acoustic energy in generating solid particle.

BACKGROUND

Rapid and efficient production of particles, particularly small and/or substantially uniform particles, is needed in a variety of industries. Among other advantages, small, substantially uniform particles possess favorable flow characteristics and exhibit little variation in interparticle behavior. In the pharmaceutical industry, for example, the particle size of a therapeutic agent can affect the dissolution rate, bioavailability and overall stability of the agent in a formulation. Precise control of the particle size of therapeutic agents is particularly important for sustained release applications, where the rate of active agent released is related to the size of a particle containing the agent. In addition, pulmonary delivery of a therapeutic agent requires specifically sized particles, generally on the order of about 1 μm to about 7 μm. Particles that are too large may be deposited within the throat, while particles that are too small will be exhaled. Thus, the ability to produce small, uniform particles of a therapeutic agent is critically important in the development of particulate pharmaceutical products.

Various approaches for attaining small and uniform particles have been used. Conventional comminution techniques, e.g., crushing, grinding and milling, rely on mechanical forces to break apart relatively large particles into smaller particles. Air-jet mills and other mills, available from, for example, DT Industries, Bristol, Pa., under the tradename STOKES®, are commonly used by the pharmaceutical industry to decrease the particle size of a bulk therapeutic agent into a range suitable for pharmaceutical applications. One drawback to such mechanical comminution techniques, however, is that some compounds, particularly proteins and other therapeutic biomolecules, are damaged during the process. Another drawback of mechanical comminution is the wide distribution of particle sizes produced by these techniques. Among other problems, large variations in the size of particles limit the ability to produce sustained-release formulations and waste large amounts of therapeutic agents intended, for example, for inhalation. Although sieving a comminuted therapeutic agent through an appropriate mesh screen provides a more narrow particle size distribution, large quantities of particles not having the desired size are wasted and the potential for contamination is increased, as the therapeutic agent must contact additional surfaces.

Other techniques for producing particles include conventional recrystallization methods. In such methods, the compound of interest is initially dissolved in a suitable solvent. In one approach, the temperature of the solution is changed so that the solubility of the solute is decreased. In another approach, a second solvent, an "anti-solvent," is added so that the solubility of the solute is decreased. In both approaches, the solute precipitates or crystallizes out of the solution due to reduced solubility in the altered solution. These methods, however, often require toxic solvents, result in wet particles (that require further processing, e.g., drying), and may produce particles having variable sizes.

Supercritical fluid technology has solved some of these problems. One method for using this relatively new technology is called the rapid expansion of supercritical solutions or "RESS" method. See Tom et al. (1991) *Biotechnol. Prog.* 7(5):403–411. In the RESS method, the compound of interest is first solubilized in a supercritical fluid, i.e., a fluid at a temperature and pressure greater than its critical temperature ($T_c$) and critical pressure ($P_c$). Generally, the supercritical fluid is carbon dioxide, although other fluids are available. The solution is then rapidly passed through a nozzle that is connected to a relatively low-pressure medium. The sudden depressurization of the solution as it passes into the relatively low-pressure medium causes the supercritical fluid to expand, i.e., the density of the supercritical fluid decreases, reducing the ability of the supercritical fluid to solubilize the compound. As a direct consequence of the reduced solubility, a supersaturated solution develops, which, in turn, causes the solute to precipitate or crystallize out in very small particles.

A variation of this idea is to prepare a solution of a particular compound in a conventional solvent, and then spray the solution through a nozzle into a supercritical fluid that acts as an anti-solvent. When the two fluids make contact, a rapid volume expansion occurs, reducing solvent density and solvent capacity, in turn increasing supersaturation, solute nucleation and particle formulation. This method is commonly referred to as gas anti-solvent recrystallization or "GAS." See, for example, Debenedetti et al. (1993) *J. Control. Release* 24:27–44 and PCT WO 00/37169 to Merrifield. This process has been applied to various proteins to produce particle sizes of about 5 μm. See European Patent No. 0 542 314.

Although use of supercritical fluid technology offers the capability of producing relatively small particles of uniform size, it is not without drawbacks. One problem associated with these supercritical methods is the reliance on nozzles and tubes for delivering the solutions. Nozzles are known to wear down over time, altering the geometry of the equipment and affecting the size of the droplets formed. In addition, nozzles may become blocked during use, when, for example, particles agglomerate upon rapid expansion within the nozzle bore. In addition, nozzles and associated components require cleaning and may contaminate solutions when not properly maintained.

Furthermore, the droplet sizes of the solutions (both supercritical and conventional solutions) produced by methods relying on nozzles are relatively varied. As a result there will be a large variance of the surface tension between droplets of different sizes. At the sizes required for supercritical methods, the differences in surface tension between droplets causes large variations in crystallization kinetics and growth. These differences result in differently sized particles. Although U.S. Pat. No. 5,874,029 to Subramaniam et al. discusses methods for producing small-sized droplets using nozzles, the methods still suffer from the inability to effectively and consistently produce droplets of uniform size.

Thus, there is a need in the art for an improved particle formation technique wherein particle formation is highly reproducible, controllable and predictable, and substantially uniform particle size can be achieved. An ideal method would minimize or eliminate contact of the particle-forming fluid(s) with surfaces of process equipment or contaminants adsorbed thereon. The present invention addresses the aforementioned need in the art by using focused acoustic energy to eject particle-forming droplets from a solution of a compound of interest.

SUMMARY OF THE INVENTION

Accordingly, it is a primary object of the invention to address the aforementioned need in the art by providing a novel method and device for generating particles using focused acoustic ejection technology.

Additional objects, advantages and novel features of the invention will be set forth in part in the description which follows, and in part will become apparent to those skilled in the art upon examination of the following, or may be learned by practice of the invention.

In one aspect, then, the invention provides a method and device for generating solid particles using focused acoustic energy. A solution of a compound of interest is provided in a solvent, which may be an aqueous fluid, a nonaqueous fluid, or a supercritical fluid. Focused acoustic energy is used to eject a droplet of the solution, which is then directed into or through an antisolvent that upon admixture with the solution droplet causes the compound the droplet to precipitate. The solid particle that results is then collected. In a preferred embodiment, the solvent is an aqueous or organic liquid, and the antisolvent is a supercritical fluid. It will be appreciated that the compound of interest must be less soluble in the antisolvent than in the solvent, and substantially inert in both the solvent and antisolvent.

Generally, the solution and the antisolvent will both be present in the reservoir, with the reservoir being covered or otherwise enclosed so as to provide the "contained space." The particles resulting from the ejected droplets are collected on a surface within the contained space, typically on a surface within the reservoir enclosure.

With supercritical antisolvents, expansion of the solution droplet upon ejection into a lower pressure supercritical medium causes rapid depressurization of the droplet, supersaturation thereof, and precipitation of virtually contaminant-free particles, ideally in crystalline form.

The method is advantageous in a number of respects. For example, the method:

can be used to prepare very small particles, on the order of microns or even nanometers in diameter;

gives rise to particles of substantially uniform size, i.e., having a narrow particle size distribution;

can be used to prepare different crystal structures of a single molecular entity (i.e., by selection of a proper solvent and/or solvent-cosolvent combination);

is highly reproducible, controllable and predictable;

can be readily scaled up, but is also quite effective with very small quantities of both solutes and fluids, making it ideal for manufacturing particles of rare and/or expensive compounds;

is a single-step process, in contrast to the many multi-step processes of the prior art; and is suitable for use with a wide range of molecular entities.

In another aspect, the invention provides a device for carrying out the aforementioned method. The device comprises: a reservoir containing a solution of the compound of interest in a solvent; an antisolvent in a contained space in fluid communication with the solution in the reservoir such that droplets ejected from the solution are directed into the antisolvent; an acoustic ejector comprising an acoustic radiation generator for generating acoustic radiation and a focusing means for focusing the acoustic radiation at a focal point within the solution in the reservoir so as to eject a droplet therefrom; and, optionally, a means for positioning the ejector in acoustic coupling relationship to the reservoir.

DETAILED DESCRIPTION OF THE INVENTION

Figure 1A:
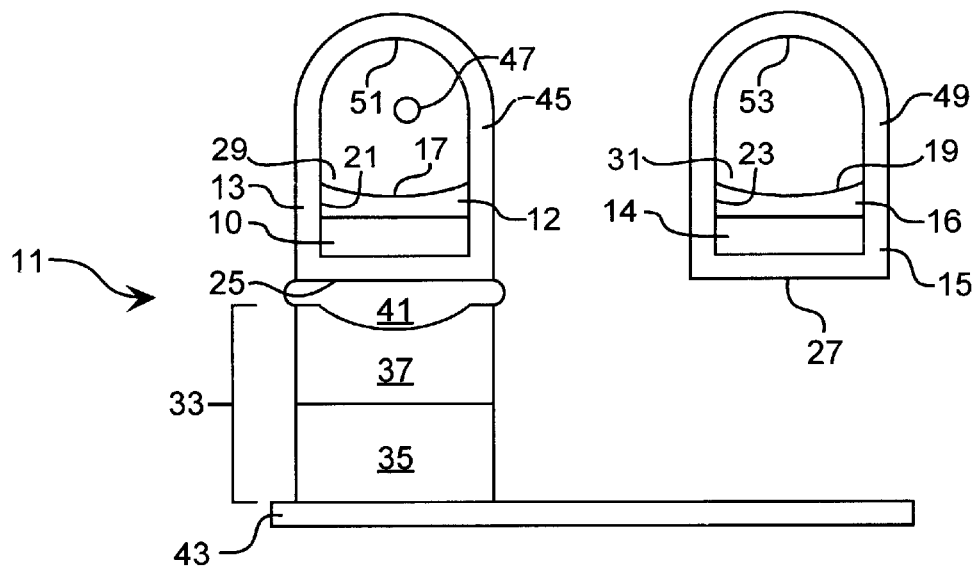
FIGS. 1A and 1B, collectively referred to as FIG. 1, schematically illustrate in simplified cross-sectional view a focused acoustic energy device useful in conjunction with preparing solid particles according to the method of the invention.

Before describing the present invention in detail, it is to be understood that unless otherwise indicated this invention is not limited to specific fluids, solutes, acoustic ejection devices, or the like, as such may vary. It is also to be understood that the terminology used herein is for the purpose of describing particular embodiments only, and is not intended to be limiting.

It must be noted that, as used in this specification and the appended claims, the singular forms "a," "an" and "the" include plural referents unless the context clearly dictates otherwise. Thus, for example, the term "a solvent" is intended to mean a single solvent or a mixture of a solvent with one or more cosolvents, "a compound of interest" refers to a single compound as well as to a mixture of different compounds, "an antisolvent" includes one antisolvent or a mixture of different antisolvents, "a reservoir" is intended to mean one or more reservoirs, and the like.

In describing and claiming the present invention, the following terminology will be used in accordance with the definitions set out below.

The terms "acoustic coupling" and "acoustically coupled" used herein refer to a state wherein a first entity is placed in direct or indirect contact with another entity so as to allow acoustic radiation to be transferred between the objects without substantial loss of acoustic energy. When two entities are indirectly acoustically coupled, an "acoustic coupling medium" is needed to provide an intermediary through which acoustic radiation may be transmitted. Thus, an ejector may be acoustically coupled to a fluid, e.g., by immersing the ejector in the fluid or by interposing an acoustic coupling medium between the ejector and the fluid to transfer acoustic radiation generated by the ejector through the acoustic coupling medium and into the fluid.

The term "fluid" as used herein refers to matter that is nonsolid or at least partially gaseous and/or liquid. A fluid may contain a solid that is minimally, partially or fully solvated, dispersed or suspended. Examples of fluids include, without limitation, aqueous liquids (including water per se and buffered water), nonaqueous liquids such as organic solvents and lipidic liquids, supercritical fluids, gases, and the like.

The term "supercritical fluid" refers to a fluid at or above both its critical pressure $P_c$ and critical temperature $T_c$. The molar volume and solubilizing capacity of a supercritical fluid can be substantially altered by varying the temperature and/or pressure of the fluid. Fluids that are slightly below their actual critical temperature and pressure can also exhibit such characteristics, and the term "supercritical fluid" is intended to encompass such fluids as well.

The term "solvent" refers to a fluid that is capable of at least partially dissolving a solute of interest.

The term "antisolvent" refers to a fluid that when mixed with a solvent in which a solute is dissolved, reduces the capacity of the solvent to dissolve the solute. Thus, when an antisolvent is admixed with a solution of a solute in a solvent, the solubility of the solute can be reduced to the point at which it precipitates out of solution. Gases, and particularly compressed gases, can act as antisolvents, although the preferred antisolvents herein are in a supercritical fluid state. The antisolvent must be sufficiently miscible with the solvent that solute precipitation does in fact result. It will be appreciated that miscibility can be controlled by varying one or more parameters within the solvent/antisolvent system, e.g., the solvent and antisolvent system may be maintained at a sufficiently low temperature so that the two fluids are not particularly miscible (for storage, for example), and the temperature may then be raised so that the two fluids are miscible and particle formation can occur.

The term "focusing means" as used herein refers to a device that causes acoustic waves to converge at a focal point by an action analogous to that of an optical lens. A focusing means may be as simple as a solid member having a curved surface, or it may include complex structures such as those found in Fresnel lenses, which employ diffraction in order to direct acoustic radiation.

The terms "particle" and "solid particle" are used interchangeably herein to refer to solid particles or particles that include solid matter. Generally, the average size of the particles prepared using the method of the invention is in the range of approximately 0.1 nm to about 5 $\mu$m in diameter, more typically in the range of approximately 5 nm to about 2.5 $\mu$m. A "droplet" is distinguishable from a particle in that droplets are nonsolid.

The term "reservoir" as used herein refers a receptacle or chamber for holding or containing a fluid. Thus, a fluid in a reservoir necessarily has a free surface, i.e., a surface that allows a droplet to be ejected therefrom.

"Optional" or "optionally" means that the subsequently described circumstance may or may not occur, so that the description includes instances where the circumstance occurs and instances where it does not.

The compound of interest, i.e., the compound to be prepared in the form of solid particles, may be any molecular entity, although obviously those compounds that are particularly suited to uses involving particles will be the primary compounds of interest. Accordingly, the method of the invention may be used to provide powders and particles for a variety of industrial and other uses, including, by way of example, pharmaceuticals (see co-pending patent application U.S. Ser. No. 09/823,899 to David Lee, entitled "Generation of Pharmaceutical Agent Particles Using Focused Acoustic Energy," assigned to Picoliter Inc. (Sunnyvale, Calif.) and filed on even date herewith), cosmetics, foodstuffs, polymer technology (including plastics, fibers, biopolymers, etc.), chemical reagents, catalysts, energy storage materials, fuel cells, propellants, ceramics, microelectronics, photographic film and developer products, colorants (including pigments, dyes, etc.), phosphors, powder metallurgy products, ceramics, papermaking technology, etc. The following examples of compounds of interest and uses thereof are included for purposes of illustration and are not intended to be limiting.

Catalysts: Generally although not necessarily metal-based, comprised of a single metal, a mixture or alloy of two or more metals, or an organometallic complex (e.g., metallocenes, Ziegler-Natta catalysts).

Ceramics: Generally although not necessarily based on oxides, carbides, nitrides, borides, and silicates, including, for example, silicon nitride, silicon oxynitride, silicon carbide, tungsten carbide, tungsten oxycarbide, molybdenum carbide, aluminum oxide, calcium oxide, magnesium oxide, titanium oxide, aluminum silicates (e.g., sillimanite and mullite), magnesium silicates (forsterite), zirconium silicates (zircon), magnesium aluminum oxide (spinel), etc.

Metals: Industrially or otherwise useful metal particles may be comprised of any metal or metallic alloy or composite, e.g., silver, gold, copper, lithium, aluminum, platinum, palladium, or the like.

Semiconductor materials include, but are not limited to, silicon, silicon dioxide, other metal oxides, germanium, and silicon-germanium. Semiconductors also include those comprised of a first element selected from Group 13 of the Periodic Table of the Elements and a second element selected from Group 15 (GaN, GaP, GaAs, GaSb, InN, InP, InAs, InSb, and the like); and those comprised of a first element selected from Groups 2 and 12 of the Periodic Table of the Elements and a second element selected from Group 16 (e.g., ZnS, ZnSe, ZnTe, CDs, CdSe, CdTe, HgS, HgSe, HgTe, MgS, MgSe, MgTe, CaS, CaSe, CaTe, SrS, SrSe, SrTe, BaS, BaSe, BaTe, and the like).

Conductive and semiconductive organics are typically conjugated polymers, for example, cis and trans polyacetylenes, polydiacetylenes, polyparaphenylenes, polypyrroles, polythiophenes, polybithiophenes, polyisothianaphthene, polythienylvinylenes, polyphenylenesulfide, polyaniline, polyphenylenevinylenes, and polyphenylenevinylene derivatives, e.g., poly(2-methoxy-5-(2-ethylhexyloxy)-1,4-phenylene vinylene ("MEH-PPV") (see U.S. Pat. No. 5,189,136 to Wudl et al.), poly(2,5-bischelostanoxy-1,4-phenylene vinylene) ("BCHA-PPV") (e.g., as described in International Patent Publication No. WO 98/27136), and poly(2-N,N-dimethylamino phenylene vinylene)(described in U.S. Pat. No. 5,604,292 to Stenger-Smith et al.).

Capacitor materials: Particles useful in capacitors include polyester, polypropylene, polystyrene, glass, silica, mica, silver mica, aluminum oxide, tantalum oxide, and barium titanate.

Colorants include dyes and pigments. Dyes include azo or "direct" dyes as well as disperse dyes and dyes containing reactive groups, e.g., dyes containing acidic groups (e.g., carboxylate, phosphonate or sulfonate moieties), basic groups (e.g., unsubstituted amines or amines substituted with 1 or 2 alkyl, typically lower alkyl, groups), or both. Dyes may also be luminescent, e.g., from the fluorescein, rhodamine, pyrene and porphyrin families. Inorganic pigments include, for example, iron blue, titanium dioxide, red iron oxide, strontium chromate, hydrated aluminum oxide, zinc oxide, zinc sulfide, lithopone, antimony oxide, zirconium oxide, kaolin (hydrous aluminosilicate), and carbon black. Organic pigments include, without limitation: azo pigments such as azo lake pigments, insoluble azo pigments, condensed azo pigments, and chelated azo pigments; polycyclic pigments such as phthalocyanine pigments, perylene pigments, perynone pigments, anthraquinone pigments, quinacridone pigments, dioxazine pigments, thio-indigo pigments, isoindolinone pigments, and quinophthalone pigments; nitro pigments; nitroso pigments; and aniline black.

Energy storage materials: In high voltage systems, examples of suitable particles for use in anodes include, but are not limited to, lithium, lithium/aluminum alloys, carbon, graphite, nitrides, and tin oxide. Suitable particles for use in cathodes include manganese oxide (spinel), lithium cobalt oxide, lithium nickel oxide, vanadium oxide, iron oxide, mixed metal oxides, iron sulfide, copper sulfide, CFx, iodine, sulfur, mixed metal sulfides, metal and mixed metal phosphates.

Battery Applications: Particles for use as anodes in alkaline battery applications include, but are not limited to, zinc and various zinc alloys with, e.g., lead, mercury, indium, tin, etc. Suitable alkaline cathodes include, for example, manganese dioxide, silver oxide with graphite and carbon for electronic conduction. Metal hydride battery electrode materials are typically nickel alloys with lanthanum and other trace elements.

Fuel cells: In direct methanol fuel cells platinum-ruthenium alloy particles or particles made from platinum-based alloys in which a second metal is tin, iridium, osmium, or rhenium are suitable for use as anodes. Cathodes may be prepared from platinum particles.

Photographic applications: Examples of particles that may be used in photographic applications include, but are not limited to, silver halides such as silver chloride, silver bromide, silver bromoiodide, and dye sensitive variants thereof.

Phosphors: Phosphors are normally composed of inorganic luminescent materials that absorb incident radiation and subsequently emit radiation within the visible region of the spectrum. Phosphors are preferably capable of maintaining luminescence (e.g., fluorescence) under excitation for a relatively long period of time to provide superior image reproduction. Various phosphors include, for example, $Y_2O_3$:Eu,ZnS:Ag,$Zn_2SiO_4$:Mn,ZnO:Zn, and other doped rare earth metal oxides.

Powder metallurgy products: Examples of suitable powder metallurgy particles include tungsten copper, silver tungsten, silver graphite, silver nickel, tungsten molybdenum, high density tungsten based heavy metals, tungsten carbide. Other ferrous and non-ferrous particles include iron and steel, iron, copper steel, iron nickel steel, low alloy steels, sinter hardened steels, and copper infiltrated steels, along with a variety of bronze, copper and brass materials.

Resins: Examples of synthetic resin particles include, without limitation, polyester resin particles, polyamide resin particles, polyvinyl chloride resin particles, polyurethane resin particles, urea resin particles, polystyrene resin particles, particles of styrene-acrylic copolymers (copolymers of styrene and derivatives of (meth)acrylic acid), polymethyl methacrylate particles, melamine resin particles, epoxy resin particles, and silicone resin particles. A wide variety of other polymeric particles are also useful, e.g., in plastics technology, fiber manufacturing, etc.

Pharmaceuticals: As pointed out in co-pending, commonly assigned U.S. patent application Ser. No. 09/823,899 to Lee, referenced above, particulate pharmaceuticals may be manufactured with a host of active agents, including those that occur in nature as well as those that are chemically modified naturally occurring compounds or a non-naturally occurring compound that is chemically synthesized. The agent will typically be chosen from the generally recognized classes of pharmacologically active agents, including, but not necessarily limited to, the following: analgesic agents; anesthetic agents; antiarthritic agents; respiratory drugs, including antiasthmatic agents; anticancer agents, including antineoplastic drugs; anticholinergics; anticonvulsants; antidepressants; antidiabetic agents; antidiarrheals; antihelminthics; antihistamines; antihyperlipidemic agents; antihypertensive agents; anti-infective agents such as antibiotics and antiviral agents; antiinflammatory agents; antimigraine preparations; antinauseants; antiparkinsonism drugs; antipruritics; antipsychotics; antipyretics; antispasmodics; antitubercular agents; antiulcer agents; anxiolytics; appetite suppressants; attention deficit disorder (ADD) and attention deficit hyperactivity disorder (ADHD) drugs; cardiovascular preparations including calcium channel blockers, CNS agents; beta-blockers and antiarrhythmic agents; central nervous system stimulants; cough and cold preparations, including decongestants; diuretics; genetic materials; herbal remedies; hormonolytics; hypnotics; hypoglycemic agents; immunosuppressive agents; leukotriene inhibitors; mitotic inhibitors; muscle relaxants; narcotic antagonists; nicotine; nutritional agents, such as vitamins, essential amino acids and fatty acids; ophthalmic drugs such as antiglaucoma agents; parasympatholytics; psychostimulants; sedatives; steroids; sympathomimetics; tranquilizers; and vasodilators including general coronary, peripheral and cerebral. The pharmaceutical agent may also be a biomolecule, e.g., a molecular moiety selected from the group consisting of DNA, RNA, antisense oligonucleotides, peptidyl drugs, i.e., peptides, polypeptides and proteins (including fluorescent proteins), ribosomes and enzyme cofactors such as biotin.

For controlled release particles, from which the compound of interest releases gradually in a controlled manner, a degradable (e.g., hydrolyzable) polymer may be incorporated into the solid particles prepared according to the invention. The polymer may be used in any convenient amount relative to the compound of interest, and the weight ratio of the polymer to the compound of interest can vary from about 0.1 to 1 to about 100,000 to 1 depending upon the application. Most controlled release applications, however, will involve a weight ratio of from about 10 to 1 to about 100 to 1. Any polymer may be used that may be co-dissolved in a solvent along with the compound of interest. Examples of degradable polymers include those prepared by polymerization of at least one of the following: an α-hydroxycarboxylic acid; a cyclic diester of an α-hydroxycarboxylic acid; a dioxanone; a lactone; a cyclic carbonate; a cyclic oxalate; an epoxide; a glycol; and an anhydride. Preferred degradable polymers are poly(ortho esters), poly (ε-caprolactone), and poly (lactide-co-glycolide). The degradable polymers may be a homopolymer or a copolymer of two or more different monomers. Preferred homopolymers include poly(lactic acid), polylactide, poly(glycolic acid), polyglycolide and poly (ethylene glycol).

Depending on the hydrophilicity of the compound of interest, suitable solvents for the compound of interest will be either hydrophilic or lipophilic. Hydrophilic compounds will of course dissolve in aqueous solvents and other hydrophilic solvents, while hydrophobic compounds will dissolve in lipophilic, nonaqueous solvents, the latter including, for example, many organic solvents and lipidic fluids. Supercritical fluids may also serve as solvents for the compound of interest, but will generally be used as antisolvents, i.e., as precipitating fluids. The solution of the compound in the solvent will generally although not necessarily be saturated, such that supersaturation results when a solution droplet contacts and admixes with the antisolvent.

Aqueous solvents comprise water, and may additionally include other components that are soluble or miscible in the water, which components may be useful or desired for particular applications. Thus, aqueous solvents herein may include, but not limited to, water, a water-ethanol or water-isopropanol admixture, ammonia water, a buffered aqueous medium, acidified water, basified water, and the like.

Examples of organic solvents include, without limitation: hydrocarbons, including aliphatic alkanes such as hexane, heptane, decalin, octane, etc., cyclic alkanes such as cyclohexane, and aromatic hydrocarbons such as benzene, cumene, pyridine, pseudocumene, cymene, styrene, toluene, xylenes, tetrahydronaphthalene and mesitylene; halogenated compounds such as carbon tetrachloride and chlorinated, fluorinated and brominated hydrocarbons such as chloroform, bromoform, methyl chloroform, chlorobenzene, o-dichlorobenzene, chloroethane, 1,1-dichloroethane, 1,2-dichloroethane, tetrachloroethane, epichlorohydrin, trichloroethylene and tetrachloroethylene; ethers such as diethyl ether, diisopropyl ether, diisobutyl ether, diglyme, 1,4-dioxane, 1,3-dioxolane, dimethoxymethane, furan and tetrahydrofuran; aldehydes such as methyl formate, ethyl formate and furfural; ketones such as acetone, diisobutyl ketone, cyclohexanone, methyl ethyl ketone, N-methyl-2-pyrrolidone and isophorone; amides such as dimethyl formamide and dimethyl acetamide; alcohols such as ethanol, isopropanol, n-propanol, t-butyl alcohol, cyclohexanol, 1-hexanol, 1-octanol and trifluoroethanol; polyhydric alcohols such as 1,3-propanediol, glycerol, ethylene glycol, propylene glycol, and low molecular weight (typically less than 400) polyethylene glycol; amines, including cyclic amines such as pyridine, piperidine, 2-methylpyridine, morpholine, etc., and mono-, di- and tri-substituted amines such as trimethylamine, dimethylamine, methylamine, triethylamine, diethylamine, ethylamine, n-butylamine, t-butylamine, triethanolamine, diethanolamine and ethanolamine, and amine-substituted hydrocarbons such as ethylene diamine, diethylene triamine; carboxylic acids such as acetic acid, trifluoroacetic acid and formic acid; esters such as ethyl acetate, isopentyl acetate, propylacetate, etc.; lactams such as caprolactam; nitriles such as acetonitrile, propane nitrile and adiponitrile; organic nitrates such as nitrobenzene, nitroethane and nitromethane; and sulfides such as carbon disulfide.

The solvent may also be a lipidic material including, but not limited to, the following: phospholipids such as phosphorylated diacyl glycerides, and particularly phospholipids selected from the group consisting of diacyl phosphatidylcholines, diacyl phosphatidylethanolamines, diacyl phosphatidylserines, diacyl phosphatidylinositols, diacyl phosphatidylglycerols, diacyl phosphatidic acids, and mixtures thereof, wherein each acyl group contains about 10 to about 22 carbon atoms and is saturated or unsaturated; fatty acids such as isovaleric acid, valeric acid, caproic acid, enanthic acid, caprylic acid, pelargonic acid, capric acid, lauric acid, myristic acid, palmitic acid, stearic acid, arachidic acid, behenic acid, lignoceric acid, oleic acid, linoleic acid, linolenic acid, and arachidonic acid; lower fatty acid esters comprising esters of the foregoing fatty acids, wherein the carboxylic acid group of the fatty acid is replaced with an ester moiety —(CO)—OR wherein R is a $C_1$-$C_3$ alkyl moiety optionally substituted with one or two hydroxyl groups; fatty alcohols corresponding to the aforementioned fatty acids, wherein the carboxylic acid group of the fatty acid is replaced by a —$CH_2OH$ group; glycolipids such as cerebroside and gangliosides; oils, including animal oils such as cod liver oil and, menhaden oil, and vegetable oils such as babassu oil, castor oil, corn oil, cotton seed oil, linseed oil, mustard oil, olive oil, palm oil, palm kernel oil, peanut oil, poppyseed oil, rapeseed oil, safflower oil, sesame oil, soybean oil, sunflower seed oil, tung oil or wheat germ oil; and waxes, i.e., higher fatty acid esters, including animal waxes such as beeswax and shellac, mineral waxes such as montan, petroleum waxes such as microcrystalline wax and paraffin, and vegetable waxes such as carnauba wax.

In a preferred embodiment, a supercritical fluid is used as the antisolvent, or precipitating fluid, effective to cause the compound of interest to precipitate upon admixture of the antisolvent with the solution containing the compound. Although it is preferable that the compound be insoluble in the antisolvent, it is sufficient for the purpose of the present invention that the compound be less soluble in the antisolvent than in the solvent. Thus, it is possible that the antisolvent fluid may be capable of dissolving some amount of the compound of interest, although in a preferred embodiment, the antisolvent fluid is substantially incapable of dissolving a significant portion of the compound. Also, the antisolvent fluid is at least partially miscible with the organic solvent such that the antisolvent fluid is capable of penetrating into the compound—solvent solution sufficiently to cause the desired precipitation of the compound. The antisolvent fluid may comprise any suitable fluid for near critical or supercritical processing. These fluids include, for example, carbon dioxide, water, ammonia, nitrogen, nitrous oxide, methane, ethane, ethylene, propane, butane, n-pentane, benzene, methanol, ethanol, isopropanol, isobutanol, halocarbons (including monofluoromethane, trifluoromethane, chlorotrifluoromethane, monofluoromethane, hexafluoroethane 1,1-difluoroethylene and 1,2-difluoroethylene), toluene, pyridine, cyclohexane, m-cresol, decalin, cyclohexanol, o-xylene, tetralin, aniline, acetylene, chlorotrifluorosilane, xenon, sulfur hexafluoride, propane, and others. Cosolvents or other modifiers may be added to the supercritical fluid to change its intrinsic properties in or around the critical point. Suitable cosolvents and modifiers are known in the art and include, for example, methanol, ethanol, isopropanol and acetone.

For many compounds, it is desirable to use an antisolvent fluid that permits processing at relatively mild temperatures. For processing of proteins and polypeptides, for example, the antisolvent fluid should preferably have a critical temperature of from about 0° C. to about 50° C. Included in this category of antisolvent fluids are carbon dioxide, nitrogen, nitrous oxide, ethane, ethylene, chlorotrifluoromethane, monofluoromethane, acetylene, 1,1-difluoroethylene, hexafluoroethane, chlorotrifluorosilane, and xenon. A particularly preferred antisolvent fluid is carbon dioxide because it is readily available, non-toxic (it has "GRAS," or "generally regarded as safe," status), non-flammable, relatively low cost, has low chemical reactivity, and has a critical temperature of 31.3° C. and a critical pressure of 72.9 atm (1072 psi), which permits processing under relatively mild conditions. Another preferred supercritical fluid is nitrogen.

In preparing solid particles according to the invention, focused acoustic energy is used substantially as described in detail in co-pending patent applications U.S. Ser. No. 09/669,996 ("Acoustic Ejection of Fluids From a Plurality of Reservoirs"), inventors Ellson and Foote, and U.S. Ser. No. 09/669,194 ("Method and Device for Generating Droplets of Immiscible Fluids"), inventors Ellson, Mutz and Foote, both filed on Sep. 25, 2000 and assigned to Picoliter Inc. (Sunnyvale, Calif.). FIG. 1 illustrates a focused acoustic ejection device that can be used in accordance with the foregoing method. The device is shown in simplified cross-sectional view, wherein, as with all figures referenced herein, like parts are referenced by like numerals, the figure is not necessarily to scale, and certain dimensions may be exaggerated for clarity of presentation. The device 11 may include a single reservoir, two reservoirs, or a plurality of reservoirs. For simplicity, the device is illustrated as containing two reservoirs, with a first reservoir indicated at 13 and a second reservoir indicated at 15. Each reservoir contains a solution of the compound of interest provided in a solvent, with the antisolvent in a contained space generally above and in fluid communication with the solution in the reservoir such that droplets ejected from the solution are directed into the antisolvent. The solvent may comprise a mixture of solvents, and the antisolvent, similarly, may comprise a mixture of antisolvents. Reservoirs containing both the solution and the antisolvent are illustrated in the figure, with reservoir 13 containing the solvent solution as a lower fluid 10 and the antisolvent as an upper fluid 12, and, analogously, reservoir 15 containing the solvent solution as a lower fluid 14 and the antisolvent as an upper fluid 16. Generally, with liquid antisolvents, the upper fluid layer comprised of the antisolvent will have a thickness (i.e., height) that is less than about 10% of the thickness of the lower fluid layer comprised of the solvent, typically in the range of about 0.1% to 5% of the thickness of the lower fluid. It must be emphasized, however, that the two-phase system is illustrated and described merely for simplicity, and each reservoir may contain three or more fluids, and the invention is not limited in this regard. For example, a third fluid may be incorporated so as to physically segregate the solvent and antisolvent. Alternatively, the solvent and antisolvent may be maintained in a substantially segregated state by maintaining the solvent, the antisolvent, or both, at a predetermined temperature and pressure.

With liquid antisolvents, upper fluid layers 12 and 16 will have fluid surfaces respectively indicated at 17 and 19. As shown, the reservoirs are of substantially identical construction so as to be substantially acoustically indistinguishable, but identical construction is not a requirement. The reservoirs are shown as separate removable components but may, if desired, be fixed within a plate or other substrate. For example, the reservoirs may be individual wells in a well plate. Each of the reservoirs 13 and 15 is preferably axially symmetric as shown, having vertical walls 21 and 23 extending upward from circular reservoir bases 25 and 27 and terminating at openings 29 and 31, respectively, although other reservoir shapes may be used. The material and thickness of each reservoir base should be such that acoustic radiation may be transmitted therethrough.

The device also includes an acoustic ejector 33 comprised of an acoustic radiation generator 35 for generating acoustic radiation and a focusing means 37 for focusing the acoustic radiation at a focal point within the upper fluid layer or the lower fluid layer, but is preferably just below the interface therebetween. As shown in FIG. 1, the focusing means 37 may comprise a single solid piece having a concave surface 39 for focusing acoustic radiation, but the focusing means may be constructed in other ways as discussed below. The acoustic ejector 33 is thus adapted to generate and focus acoustic radiation so as to eject a droplet of fluid from the solution into the antisolvent when acoustically coupled to the reservoirs. The acoustic radiation generator 35 and the focusing means 37 may function as a single unit controlled by a single controller, or they may be independently controlled, depending on the desired performance of the device. Typically, single ejector designs are preferred over multiple ejector designs because accuracy of droplet velocity (i.e., both the speed and direction of the ejected droplet) and consistency in droplet size and velocity are more easily achieved with a single ejector.

As will be appreciated by those skilled in the art, any of a variety of focusing means may be employed in conjunction with the present invention. For example, one or more curved surfaces may be used to direct acoustic radiation to a focal point near a fluid surface. One such technique is described in U.S. Pat. No. 4,308,547 to Lovelady et al. Focusing means with a curved surface have been incorporated into the construction of commercially available acoustic transducers such as those manufactured by Panametrics Inc. (Waltham, Mass.). In addition, Fresnel lenses are known in the art for directing acoustic energy at a predetermined focal distance from an object plane. See, e.g., U.S. Pat. No. 5,041,849 to Quate et al. Fresnel lenses may have a radial phase profile that diffracts a substantial portion of acoustic energy into a predetermined diffraction order at diffraction angles that vary radially with respect to the lens. The diffraction angles should be selected to focus the acoustic energy within the diffraction order on a desired object plane.

There are also a number of ways to acoustically couple the ejector 33 to an individual reservoir and thus to the fluid therein. One such approach is through direct contact as is described, for example, in U.S. Pat. No. 4,308,547 to Lovelady et al., wherein a focusing means constructed from a hemispherical crystal having segmented electrodes is submerged in a liquid to be ejected. The aforementioned patent further discloses that the focusing means may be positioned at or below the surface of the liquid. However, this approach for acoustically coupling the focusing means to a fluid is undesirable when the ejector is used to eject different fluids in a plurality of containers or reservoirs, as repeated cleaning of the focusing means would be required in order to avoid cross-contamination. The cleaning process would necessarily lengthen the transition time between each droplet ejection event. In addition, in such a method, fluid would adhere to the ejector as it is removed from each container, wasting material that may be costly or rare.

Thus, a preferred approach, when a multiple reservoir system is employed, is to acoustically couple the ejector to the reservoirs and reservoir fluids without contacting any portion of the ejector, e.g., the focusing means, with any of the fluids to be ejected. To this end, an ejector positioning means may be provided for positioning the ejector in controlled and repeatable acoustic coupling with each of the fluids in the reservoirs to eject droplets therefrom without submerging the ejector therein. This typically involves direct or indirect contact between the ejector and the external surface of each reservoir. When direct contact is used in order to acoustically couple the ejector to each reservoir, it is preferred that the direct contact is wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs having a specially formed inverse surface.

Optimally, acoustic coupling is achieved between the ejector and the reservoir through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and each reservoir. In addition, it is important to ensure that the fluid medium is substantially free of material having different acoustic properties than the fluid medium itself. As shown, the reservoir 13 is acoustically coupled to the acoustic focusing means 37 such that an acoustic wave is generated by the acoustic radiation generator and directed by the focusing means 37 into the acoustic coupling medium 41, which then transmits the acoustic radiation into the reservoir. The acoustic ejector 33 is positionable by means of ejector positioning means 43, shown below reservoir 13, in order to achieve acoustic coupling between the ejector and the reservoir through acoustic coupling medium 41. Once the ejector, the reservoir and the substrate are in proper alignment, the acoustic radiation generator 35 is activated to produce acoustic radiation that is directed by the focusing means 37 to a focal point within solution 10 in the first reservoir. As a result, droplet 47 is ejected from the solution, into the antisolvent 12, and optionally onto a site on the underside surface 51 of the enclosure 45.

With liquid antisolvents, upper fluid layers 12 and 16 will have fluid surfaces respectively indicated at 17 and 19. As shown, the reservoirs are of substantially identical construction so as to be substantially acoustically indistinguishable, but identical construction is not a requirement. The reservoirs are shown as separate removable components but may, if desired, be fixed within a plate or other substrate. For example, the reservoirs may be individual wells in a well plate. Each of the reservoirs 13 and 15 is preferably axially symmetric as shown, having vertical walls 21 and 23 extending upward from circular reservoir bases 25 and 27 and terminating at openings 29 and 31, respectively, although other reservoir shapes may be used. The material and thickness of each reservoir base should be such that acoustic radiation may be transmitted therethrough.

The device also includes an acoustic ejector 33 comprised of an acoustic radiation generator 35 for generating acoustic radiation and a focusing means 37 for focusing the acoustic radiation at a focal point within the upper fluid layer or the lower fluid layer, but is preferably just below the interface therebetween. As shown in FIG. 1, the focusing means 37 may comprise a single solid piece having a concave surface 39 for focusing acoustic radiation, but the focusing means may be constructed in other ways as discussed below. The acoustic ejector 33 is thus adapted to generate and focus acoustic radiation so as to eject a droplet of fluid from the solution into the antisolvent when acoustically coupled to the reservoirs. The acoustic radiation generator 35 and the focusing means 37 may function as a single unit controlled by a single controller, or they may be independently controlled, depending on the desired performance of the device. Typically, single ejector designs are preferred over multiple ejector designs because accuracy of droplet velocity (i.e., both the speed and direction of the ejected droplet) and consistency in droplet size and velocity are more easily achieved with a single ejector.

As will be appreciated by those skilled in the art, any of a variety of focusing means may be employed in conjunction with the present invention. For example, one or more curved surfaces may be used to direct acoustic radiation to a focal point near a fluid surface. One such technique is described in U.S. Pat. No. 4,308,547 to Lovelady et al. Focusing means with a curved surface have been incorporated into the construction of commercially available acoustic transducers such as those manufactured by Panametrics Inc. (Waltham, Mass.). In addition, Fresnel lenses are known in the art for directing acoustic energy at a predetermined focal distance from an object plane. See, e.g., U.S. Pat. No. 5,041,849 to Quate et al. Fresnel lenses may have a radial phase profile that diffracts a substantial portion of acoustic energy into a predetermined diffraction order at diffraction angles that vary radially with respect to the lens. The diffraction angles should be selected to focus the acoustic energy within the diffraction order on a desired object plane.

There are also a number of ways to acoustically couple the ejector 33 to an individual reservoir and thus to the fluid therein. One such approach is through direct contact as is described, for example, in U.S. Pat. No. 4,308,547 to Lovelady et al., wherein a focusing means constructed from a hemispherical crystal having segmented electrodes is submerged in a liquid to be ejected. The aforementioned patent further discloses that the focusing means may be positioned at or below the surface of the liquid. However, this approach for acoustically coupling the focusing means to a fluid is undesirable when the ejector is used to eject different fluids in a plurality of containers or reservoirs, as repeated cleaning of the focusing means would be required in order to avoid cross-contamination; contamination of any sort must, of course, be avoided in the preparation of pharmaceuticals. The cleaning process would necessarily lengthen the transition time between each droplet ejection event. In addition, in such a method, fluid would adhere to the ejector as it is removed from each container, wasting material that may be costly or rare.

Thus, a preferred approach, when a multiple reservoir system is employed, is to acoustically couple the ejector to the reservoirs and reservoir fluids without contacting any portion of the ejector, e.g., the focusing means, with any of the fluids to be ejected. To this end, an ejector positioning means may be provided for positioning the ejector in controlled and repeatable acoustic coupling with each of the fluids in the reservoirs to eject droplets therefrom without submerging the ejector therein. This typically involves direct or indirect contact between the ejector and the external surface of each reservoir. When direct contact is used in order to acoustically couple the ejector to each reservoir, it is preferred that the direct contact is wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs having a specially formed inverse surface.

Optimally, acoustic coupling is achieved between the ejector and the reservoir through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and each reservoir. In addition, it is important to ensure that the fluid medium is substantially free of material having different acoustic properties than the fluid medium itself. As shown, the reservoir 13 is acoustically coupled to the acoustic focusing means 37 such that an acoustic wave is generated by the acoustic radiation generator and directed by the focusing means 37 into the acoustic coupling medium 41, which then transmits the acoustic radiation into the reservoir. The acoustic ejector 33 is positionable by means of ejector positioning means 43, shown below reservoir 13, in order to achieve acoustic coupling between the ejector and the reservoir through acoustic coupling medium 41. Once the ejector, the reservoir and the substrate are in proper alignment, the acoustic radiation generator 35 is activated to produce acoustic radiation that is directed by the focusing means 37 to a focal point within solution 10 in the first reservoir. As a result, droplet 47 is ejected from the solution, into the antisolvent 12, and optionally onto a site on the underside surface 51 of the enclosure 45.

Figure 1B:
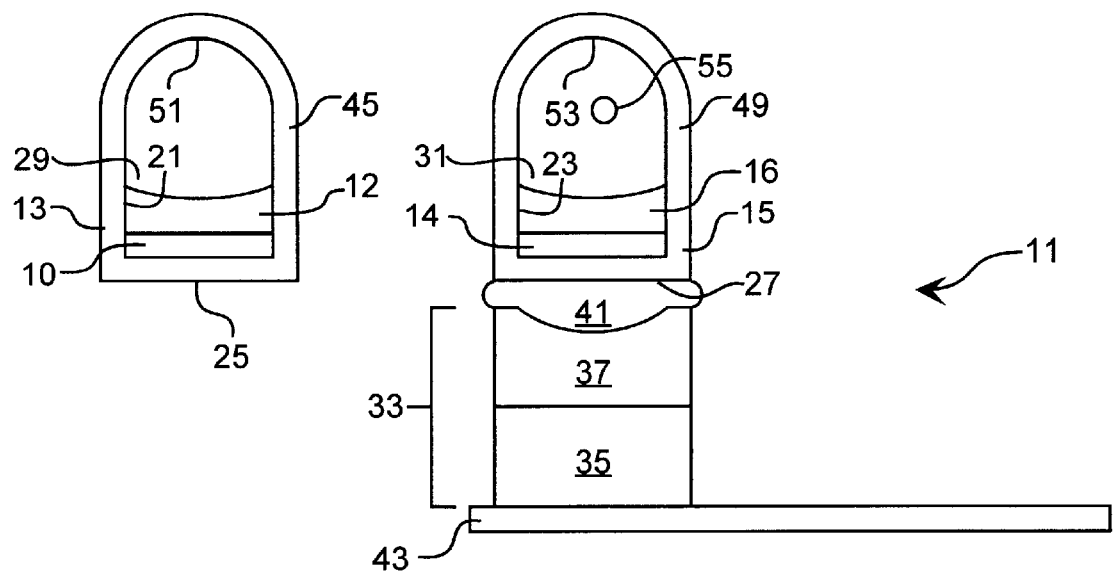

Then, as shown in FIG. 1B, the ejector 33 has been repositioned below reservoir 15 and in acoustically coupled relationship thereto by virtue of acoustic coupling medium 41. Once properly aligned as shown in FIG. 1B, the acoustic radiation generator 35 of ejector 33 is activated to produce acoustic radiation that is then directed by focusing means 37 to a focal point within the solution in reservoir 15, thereby ejecting droplet 55 into the antisolvent 16 and optionally onto the underside 53 of enclosure 49. As discussed above, a single reservoir may be used or two or more reservoirs may be used, wherein the well(s) may be removable or contained within a well plate. Similarly, a single ejector can be used, as shown in the figures, or a plurality of ejectors can be used with each ejector positioned so as to eject a droplet from a different locus within a single reservoir (if a single reservoir is used) or from each of a plurality of reservoirs. Also, unless it is intended that the ejector is to be submerged in the fluids to be ejected, the reservoirs or well plates must have acoustic transmission properties sufficient to allow acoustic radiation from the ejector to be conveyed to the surfaces of the fluids to be ejected. Typically, this involves providing reservoir or well bases that are sufficiently thin to allow acoustic radiation to travel therethrough without unacceptable dissipation. In addition, the material used in the construction of reservoirs must be compatible with the fluids contained therein. Thus, if it is intended that the reservoirs or wells contain a particular organic solvent, polymers that dissolve or swell in that solvent would be unsuitable for use in forming the reservoirs or well plates. For water-based fluids, a number of materials are suitable for the construction of reservoirs and include, but are not limited to, ceramics such as silicon oxide and aluminum oxide, metals such as stainless steel and platinum, and polymers such as polyester and polytetrafluoroethylene. Many well plates are commercially available and may contain, for example, 96, 384 or 1536 wells per well plate. Manufactures of suitable well plates for use in the inventive device include Corning Inc. (Corning, N.Y.) and Greiner America, Inc. (Lake Mary, Fla.). However, the availability of such commercially available well plates does not preclude manufacture and use of custom-made well plates containing at least about 10,000 wells, or as many as 100,000 wells or more. In addition, for multiple reservoir systems, it is preferable that the center of each reservoir is located not more than about 1 centimeter, preferably not more than about 1 millimeter and optimally not more than about 0.5 millimeter from another reservoir center. In order to ensure the accuracy of fluid ejection, it is important to determine the location and the orientation of the fluid surface from which a droplet is to be ejected with respect to the ejector. Otherwise, ejected droplets may be improperly sized or travel in an improper trajectory. Thus, another embodiment of the invention relates to a method for determining the height of a fluid surface in a reservoir between ejection events. The method involves activating the acoustic generator to produce a detection acoustic wave that travels to the fluid surface and is reflected thereby as a reflected acoustic wave. Parameters of the reflected acoustic radiation are then analyzed in order to assess the spatial relationship between the acoustic radiation generator and the fluid surface. Such an analysis will involve the determination of the distance between the acoustic radiation generator and the fluid surface and/or the orientation of the fluid surface in relationship to the acoustic radiation generator.

More particularly, the acoustic radiation generator may activated so as to generate low energy acoustic radiation that is insufficiently energetic to eject a droplet from the fluid surface in the reservoir. This is typically done by using an extremely short pulse (on the order of tens of nanoseconds) relative to that normally required for droplet ejection (on the order of microseconds). By determining the time it takes for the acoustic radiation to be reflected by the fluid surface back to the acoustic radiation generator and then correlating that time with the speed of sound in the fluid, the distance— and thus the fluid height—may be calculated. Of course, care must be taken in order to ensure that acoustic radiation reflected by the interface between the reservoir base and the fluid is discounted. It will be appreciated by those of ordinary skill in the art of acoustic microscopy that such a method employs conventional or modified sonar techniques.

Once the analysis has been performed, an ejection acoustic wave having a focal point near the fluid surface is generated in order to eject at least one droplet of the fluid, wherein the optimum intensity and directionality of the ejection acoustic wave is determined using the aforementioned analysis optionally in combination with additional data. The "optimum" intensity and directionality are generally selected to produce droplets of consistent size and velocity. For example, the desired intensity and directionality of the ejection acoustic wave may be determined by using not only the spatial relationship assessed as above, but also geometric data associated with the reservoir, fluid property data associated with the fluid to be ejected, and/or by using historical droplet ejection data associated with the ejection sequence. In addition, the data may show the need to reposition the ejector so as to reposition the acoustic radiation generator with respect to the fluid surface, in order to ensure that the focal point of the ejection acoustic wave is near the fluid surface, where desired. For example, if analysis reveals that the acoustic radiation generator is positioned such that the ejection acoustic wave cannot be focused near the fluid surface, the acoustic radiation generator is repositioned using vertical, horizontal and/or rotational movement to allow appropriate focusing of the ejection acoustic wave.

The device may include other components that enhance performance. For example, the device may further comprise cooling means for lowering the temperature of a particle collection means (e.g., an upper surface within the contained enclosure) positioned above the reservoir. The device may also comprise a heating means for maintaining the fluid in the reservoir at a constant temperature, and which, in combination with a pressurizing means, for maintaining the antisolvent in a supercritical state. Design and construction of such temperature maintaining means and pressurizing means are known to one of ordinary skill in the art. For many biomolecular applications, it is generally desired that the fluid containing the biomolecule is kept at a constant temperature without deviating more than about 1° C. or 2° C. therefrom. In addition, for a biomolecular fluid that is particularly heat sensitive, it is preferred that the fluid be kept at a temperature that does not exceed about 10° C. above the melting point of the fluid, preferably at a temperature that does not exceed about 5° C. above the melting point of the fluid. Thus, for example, when the biomolecule-containing fluid is aqueous, it may be optimal to keep the fluid at about 4° C. during ejection.

The device of the invention enables ejection of droplets at a rate of at least about 1,000,000 droplets per minute from the same reservoir, and at a rate of at least about 100,000 drops per minute from different reservoirs. In addition, current positioning technology allows for the ejector positioning means to move from one reservoir to another quickly and in a controlled manner, thereby allowing fast and controlled ejection of different fluids. That is, current commercially available technology allows the ejector to be moved from one reservoir to another, with repeatable and controlled acoustic coupling at each reservoir, in less than about 0.1 second for high performance positioning means and in less than about 1 second for ordinary positioning means. A custom designed system will allow the ejector to be moved from one reservoir to another with repeatable and controlled acoustic coupling in less than about 0.001 second. In order to provide a custom designed system, it is important to keep in mind that there are two basic kinds of motion: pulse and continuous. Pulse motion involves the discrete steps of moving an ejector into position, emitting acoustic energy, and moving the ejector to the next position; again, using a high performance positioning means with such a method allows repeatable and controlled acoustic coupling at each reservoir in less than 0.1 second. A continuous motion design, on the other hand, moves the ejector and the reservoirs continuously, although not at the same speed, and provides for ejection during movement. Since the pulse width is very short, this type of process enables over 10 Hz reservoir transitions, and even over 1000 Hz reservoir transitions.

We claim:

1. A method for generating a solid particle containing a compound of interest, the method comprising:
   providing a reservoir containing a solution of the compound in a solvent;
   providing an antisolvent in a contained space in fluid communication with the solution in the reservoir, wherein the antisolvent is selected such that the compound is less soluble in the antisolvent than in the solvent; and
   applying focused acoustic energy to the reservoir so as to produce a droplet of the solution in the antisolvent in the contained space, whereby admixture of the solution droplet and the antisolvent results in the precipitation of the compound, forming a solid particle.

2. The method of claim 1, wherein focused acoustic energy is applied to the reservoir at a plurality of loci so as to eject a plurality of droplets, whereby a plurality of solid particles is provided.

3. The method of claim 1, wherein the solvent is aqueous.

4. The method of claim 1, wherein the solvent is non-aqueous.

5. The method of claim 4, wherein the solvent is organic.

6. The method of claim 1, wherein the solvent is a supercritical fluid.

7. The method of claim 1, wherein the antisolvent is a supercritical fluid.

8. The method of claim 4, wherein the antisolvent is a supercritical fluid.

9. The method of claim 5, wherein the antisolvent is a supercritical fluid.

10. The method of claim 1, wherein the antisolvent is gaseous.

11. The method of claim 1, wherein the precipitation of the compound of interest comprises crystallization thereof.

12. The method of claim 1, wherein the solution and the antisolvent are both present in the reservoir.

13. The method of claim 12, wherein a third fluid is present as a segregating layer between the solution and the antisolvent.

14. The method of claim 12, wherein the solvent and antisolvent are maintained in a substantially segregated state by maintaining the solvent, the antisolvent, or both, at a predetermined temperature and pressure.

15. The method of any one of claims 7, 8, 9, 12, 13 and 14, wherein the antisolvent is selected from the group consisting of carbon dioxide, water, ammonia, nitrogen, nitrous oxide, methane, ethane, ethylene, propane, butane, n-pentane, benzene, methanol, ethanol, isopropanol, isobutanol, monofluoromethane, trifluoromethane, chlorotrifluoromethane, monofluoromethane, hexafluoroethane, 1,1-difluoroethylene, 1,2-difluoroethylene, toluene, pyridine, cyclohexane, m-cresol, decalin, cyclohexanol, o-xylene, tetralin, aniline, acetylene, chlorotrifluorosilane, xenon, sulfur hexafluoride, propane, and combinations thereof.

16. The method of claim 15, wherein the antisolvent is carbon dioxide.

17. The method of claim 1, wherein the solution droplet is ejected onto a surface of a substrate having the antisolvent thereon.

18. The method of claim 1, wherein the solution is a saturated solution.

19. The method of claim 1, wherein the compound of interest is hydrophilic, the solvent is hydrophilic, and the antisolvent is lipophilic.

20. The method of claim 19, wherein the compound of interest is hydrophilic, the solvent is aqueous, and the antisolvent is lipidic.

21. The method of claim 1, wherein the compound of interest is lipophilic, the solvent is lipophilic, and the antisolvent is hydrophilic.

22. The method of claim 12, wherein the solution is a lower layer having a first thickness and the antisolvent is an upper layer having a second thickness less than about 10% of the first thickness.

23. The method of claim 22, wherein the second thickness is in the range of about 0.1% to 5% of the first thickness.

24. The method of claim 22, wherein the upper layer is a molecular monolayer.

25. The method of claim 22, wherein the upper layer is a molecular bilayer.

26. The method of claim 1, wherein the size of the particle is in the range of approximately 0.1 nm to about 5 $\mu$m.

27. The method of claim 26, wherein the size of the particle is in the range of approximately 5 nm to about 2.5 $\mu$m.

28. The method of claim 1, wherein the compound of interest is metallic.

29. The method of claim 1, wherein the compound of interest is semiconductive.

30. The method of claim 1, wherein the compound of interest is ceramic.

31. The method of claim 1, wherein the compound of interest is a colorant.

32. The method of claim 1, wherein the compound of interest is a phosphor.

33. The method of claim 1, wherein the compound of interest is an energy storage material.

34. The method of claim 1, wherein the compound of interest is suitable for use in photography-related formulations and applications.

35. The method of claim 1, wherein the compound of interest is suitable for use in the manufacture of batteries.

36. The method of claim 1, wherein the compound of interest is suitable for use in fuel cells.

37. The method of claim 1, wherein the compound of interest is a catalyst.

38. The method of claim 1, wherein the compound of interest is a resin.

39. The method of claim 1, wherein the compound of interest is suitable for use in powder metallurgy applications.

40. The method of claim 1, wherein the compound of interest is a cosmetic agent.

41. The method of claim 1, wherein the compound of interest is useful in the manufacture of foodstuffs.

42. The method of claim 1, wherein the compound of interest is useful in the manufacture of propellants.

43. The method of claim 1, wherein the solution comprises two or more compounds of interest.

44. The method of claim 1, wherein the solution further comprises a degradable polymer.

45. The method of claim 1, wherein the reservoir is adapted to contain no more than about 100 nanoliters of fluid.

46. The method of claim 45, wherein the reservoir is adapted to contain no more than about 10 nanoliters of fluid.

47. A method for generating a plurality of particles containing a compound of interest, the method comprising:
provide a plurality of reservoirs each containing a solution of the compound in a solvent;
providing an antisolvent in a contained space in fluid communication with the solution in each reservoir, wherein the antisolvent is selected such that the compound is less soluble in the antisolvent than in the solvent; and
applying focused acoustic energy to each reservoir so as to produce droplets of the solution into the antisolvent in the contained space, whereby admixture of the solution droplets and the antisolvent results in the precipitation of the compound, forming solid particles.

48. The method of claim 47, wherein the focused acoustic energy is applied to each reservoir simultaneously using a plurality of acoustic ejection devices.

49. The method of claim 47, wherein the focused acoustic energy is applied to each reservoir in succession using a single acoustic ejection device.

50. A device for making solid particles of a compound of interest, comprising:
a reservoir containing a solution of the compound in a solvent;
an antisolvent in a contained space in fluid communication with the solution in the reservoir such that droplets ejected from the solution are directed into the antisolvent, wherein the antisolvent is selected such that the compound is less soluble in the antisolvent than in the solvent;
an acoustic ejector comprising an acoustic radiation generator for generating acoustic radiation and a focusing means for focusing the acoustic radiation at a focal point within the solution in the reservoir so as to eject a droplet therefrom; and
a means for positioning the ejector in acoustic coupling relationship to the reservoir.

51. The device of claim 50, comprising a single acoustic ejector.

52. The device of claim 50, comprising a plurality of acoustic ejectors positioned to direct focused acoustic energy to a plurality of loci within the solution so as to eject a plurality of droplets, whereby a plurality of solid particles is provided.

53. The device of claim 50, wherein the reservoir is adapted to contain no more than about 100 nanoliters of fluid.

54. The device of claim 50, wherein the reservoir is adapted to contain no more than about 10 nanoliters of fluid.

55. The device of claim 50, further comprising a means for maintaining the solvent in the reservoir at a constant temperature.

56. The device of claim 50, wherein the acoustic coupling relationship between the ejector and the solution in the reservoir is established by providing an acoustically conductive medium between the ejector and the reservoir.

57. The device of claim 50, wherein acoustic coupling between the ejector and the fluid in each reservoir is established at a predetermined distance between the ejector and each reservoir.

58. The device of claim 50, wherein the solvent is aqueous.

59. The device of claim 50, wherein the solvent is non-aqueous.

60. The device of claim 59, wherein the solvent is organic.

61. The device of claim 50, wherein the solvent is a supercritical fluid.

62. The device of claim 50, wherein the antisolvent is a supercritical fluid.

63. The device of claim 59, wherein the antisolvent is a supercritical fluid.

64. The device of claim 60, wherein the antisolvent is a supercritical fluid.

65. The device of claim 50, wherein the antisolvent is gaseous.

66. The device of claim 50, wherein the solution and the antisolvent are both present in the reservoir.

67. The device of claim 66, wherein a third fluid is present as a segregating layer between the solution and the antisolvent.

68. The device of claim 66, wherein the solvent and antisolvent are maintained in a substantially segregated state by maintaining the solvent, the antisolvent, or both, at a predetermined temperature and pressure.

69. The device of any one of claims 62, 63, 64, 66, 67 and 68, wherein the antisolvent is selected from the group consisting of carbon dioxide, water, ammonia, nitrogen, nitrous oxide, methane, ethane, ethylene, propane, butane, n-pentane, benzene, methanol, ethanol, isopropanol, isobutanol, monofluoromethane, trifluoromethane, chlorotrifluoromethane, monofluoromethane, hexafluoroethane, 1,1-difluoroethylene, 1,2-difluoroethylene, toluene, pyridine, cyclohexane, m-cresol, decalin, cyclohexanol, o-xylene, tetralin, aniline, acetylene, chlorotrifluorosilane, xenon, sulfur hexafluoride, propane, and combinations thereof.

70. The device of claim 69, wherein the antisolvent is carbon dioxide.

71. The device of claim 50, wherein the solution is a saturated solution.

72. The device of claim 50, wherein the compound of interest is hydrophilic, the solvent is hydrophilic, and the antisolvent is lipophilic.

73. The device of claim 72, wherein the compound of interest is hydrophilic, the solvent is aqueous, and the antisolvent is lipidic.

74. The device of claim 50, wherein the compound of interest is lipophilic, the solvent is lipophilic, and the antisolvent is hydrophilic.

75. The device of claim 66, wherein the solution is a lower layer having a first thickness and the antisolvent is an upper layer having a second thickness less than about 10% of the first thickness.

76. The device of claim 75, wherein the second thickness is in the range of about 0.1% to 5% of the first thickness.

77. The device of claim 75, wherein the upper layer is a molecular monolayer.

78. The device of claim 75, wherein the upper layer is a molecular bilayer.

79. The device of claim 50, wherein the compound of interest is metallic.

80. The device of claim 50, wherein the compound of interest is semiconductive.

81. The device of claim 50, wherein the compound of interest is ceramic.

82. The device of claim 50, wherein the compound of interest is a colorant.

83. The device of claim 50, wherein the compound of interest is a phosphor.

84. The device of claim 50, wherein the compound of interest is an energy storage material.

85. The device of claim 50, wherein the compound of interest is suitable for use in photography-related formulations and applications.

86. The device of claim 50, wherein the compound of interest is suitable for use in the manufacture of batteries.

87. The device of claim 50, wherein the compound of interest is suitable for use in fuel cells.

88. The device of claim 50, wherein the compound of interest is a catalyst.

89. The device of claim 50, wherein the compound of interest is a resin.

90. The device of claim 50, wherein the compound of interest is suitable for use in powder metallurgy applications.

91. The device of claim 50, wherein the compound of interest is a cosmetic agent.

92. The device of claim 50, wherein the compound of interest is useful in the manufacture of foodstuffs.

93. The device of claim 50, wherein the compound of interest is useful in the manufacture of propellants.

94. The device of claim 50, wherein the solution comprises two or more compounds of interest.

95. The device of claim 50, wherein the solution further comprises a degradable polymer.

96. A device for making solid particles of a compound of interest, comprising:

a plurality of reservoirs each containing a solution of the compound in a solvent;

an antisolvent in a contained space above and in fluid communication with the solution in each reservoir such that droplets ejected from the solution are directed into the antisolvent, wherein the antisolvent is selected such that the compound is less soluble therein than in the solvent;

an acoustic ejector comprising an acoustic radiation generator for generating acoustic radiation and a focusing means for focusing the acoustic radiation at a focal point within the solution in the reservoir so as to eject a droplet therefrom; and a means for positioning the ejector in acoustic coupling relationship to the reservoir.

97. The device of claim 96, comprising a single acoustic ejector.

98. The device of claim 96, comprising a plurality of acoustic ejectors positioned to direct focused acoustic energy to each reservoir so as to eject a plurality of droplets therefrom.

99. The device of claim 96, wherein each of the reservoirs is removable from the device.

100. The device of claim 96, wherein the reservoirs are individual wells in a well plate.

101. The device of claim 96, wherein the reservoirs are substantially acoustically indistinguishable.

102. The device of claim 96, comprising at least about 10,000 reservoirs.

103. The device of claim 102, comprising at least about 100,000 reservoirs.

104. The device of claim 103, comprising in the range of about 100,000 to about 4,000,000 reservoirs.

105. The device of claim 96, wherein each reservoir is adapted to contain no more than about 100 nanoliters of fluid.

106. The device of claim 96, wherein each reservoir is adapted to contain no more than about 10 nanoliters of fluid.

107. The device of claim 96, further comprising means for maintaining the solvent in each reservoir at a constant temperature.

108. The device of claim 96, wherein the acoustic coupling relationship between the ejector and the fluid in each reservoir is established by providing an acoustically conductive medium between the ejector and each reservoir.

109. The device of claim 96, wherein acoustic coupling between the ejector and the fluid in each reservoir is established at a predetermined distance between the ejector and each reservoir.

* * * * *